United States Patent
Bansal et al.

(10) Patent No.: US 10,339,011 B1
(45) Date of Patent: Jul. 2, 2019

(54) METHOD AND SYSTEM FOR IMPLEMENTING DATA LOSSLESS SYNTHETIC FULL BACKUPS

(71) Applicant: EMC IP Holding Company LLC, Hopkinton, MA (US)

(72) Inventors: Aaditya Rakesh Bansal, Bangalore (IN); Sunil Yadav, Bangalore (IN); Suman Chandra Tokuri, Bangalore (IN); Pradeep Anappa, Bangalore (IN); Soumen Acharya, Bangalore (IN); Sudha Vamanraj Hebsur, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 111 days.

(21) Appl. No.: 15/795,980

(22) Filed: Oct. 27, 2017

(51) Int. Cl.
| | |
|---|---|
| *G06F 11/14* | (2006.01) |
| *G06F 16/11* | (2019.01) |
| *G06F 16/22* | (2019.01) |
| *G06F 3/06* | (2006.01) |
| *G06F 9/455* | (2018.01) |

(52) U.S. Cl.
CPC ...... *G06F 11/1458* (2013.01); *G06F 11/1451* (2013.01); *G06F 16/128* (2019.01); *G06F 16/2246* (2019.01); *G06F 3/065* (2013.01); *G06F 9/45558* (2013.01); *G06F 11/1456* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 8,442,955 B2 * | 5/2013 | Al Kiswany | G06F 16/188 707/692 |
| 2016/0210198 A1 * | 7/2016 | Durge | G06F 11/1453 |
| 2016/0232016 A1 * | 8/2016 | Pease | G06F 16/11 |

* cited by examiner

*Primary Examiner* — Brian R Peugh
(74) *Attorney, Agent, or Firm* — Chamberlain, Hrdlicka, White, Williams & Aughtry

(57) ABSTRACT

A method and system for implementing data lossless synthetic full backups. Specifically, the method and system disclosed herein improves upon traditional synthetic full backup operations by considering all user-checkpoint branches, rather than just the active user-checkpoint branch, representing all chains of incremental changes to a virtual disk of a virtual machine. In considering all user-checkpoint branches, no data pertinent to users involved in the development of the non-active (or inactive) user-checkpoint branches is lost.

20 Claims, 6 Drawing Sheets

METHOD AND SYSTEM FOR IMPLEMENTING DATA LOSSLESS SYNTHETIC FULL BACKUPS

BACKGROUND

Synthetic full backups consolidate data pertaining to a virtual disk into a single archive file. However, presently, synthetic full backups solely archive the data associated with the various virtual disk states or versions that lead up to the current running state of the virtual disk.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for implementing data lossless synthetic full backups. Specifically, one or more embodiments of the invention improves upon traditional synthetic full backup operations by considering all user-checkpoint branches, rather than just the active user-checkpoint branch, representing chains of incremental changes to a virtual disk of a virtual machine. In considering all user-checkpoint branches, no data pertinent to users involved in the development of the non-active (or inactive) user-checkpoint branches is lost.

Figure 1:
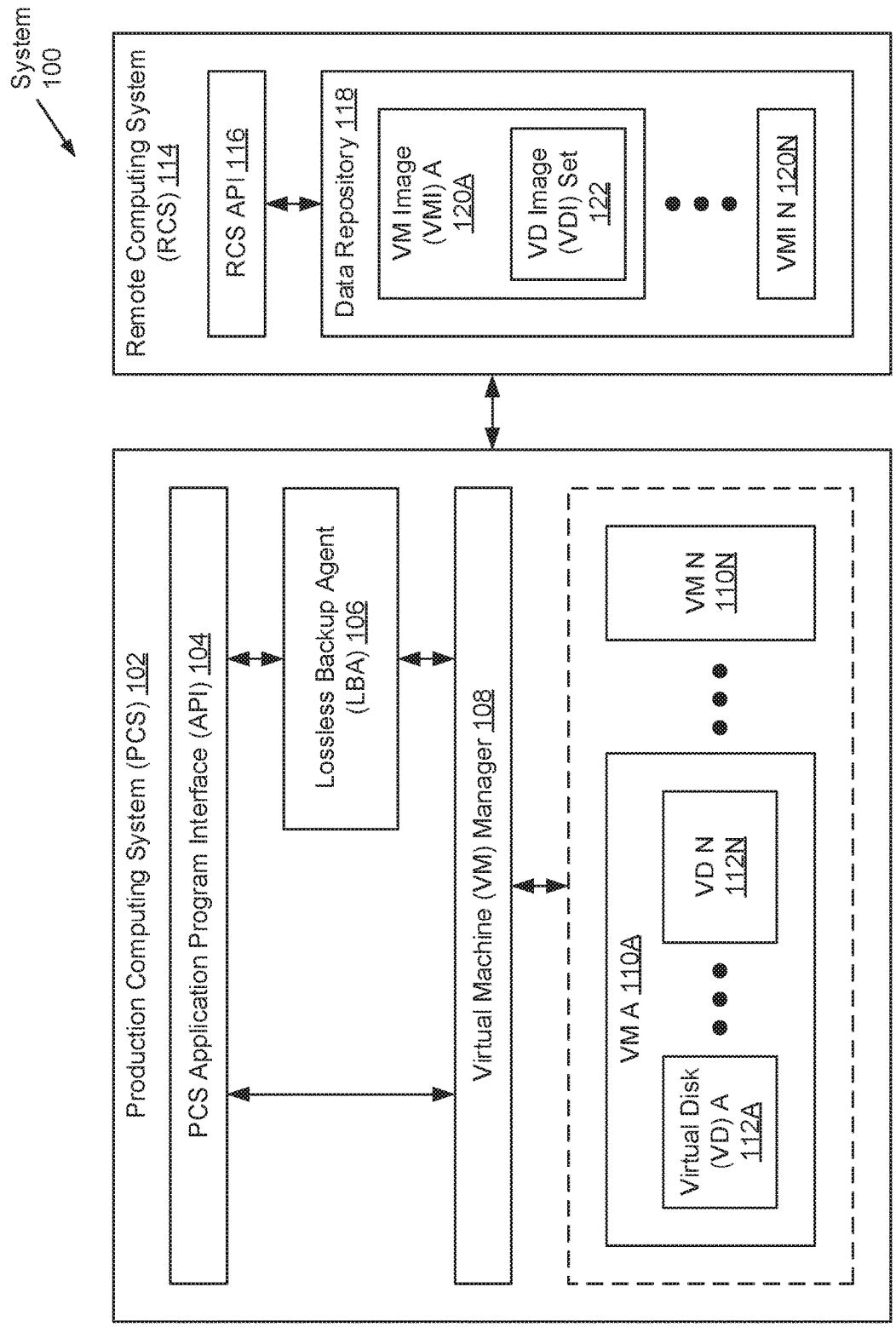
FIG. 1 shows a system in accordance with one or more embodiments of the invention.

FIG. 1 shows a system in accordance with one or more embodiments of the invention. The system (100) includes a production computing system (PCS) (102) operatively connected to a remote computing system (RCS) (114). Each of these components is described below.

In one embodiment of the invention, the aforementioned components may be directly or indirectly connected to one another through a network (e.g., a local area network (LAN), a wide area network (WAN) such as the Internet, a mobile network, or any other network). The network (not shown) may be implemented using any combination of wired and/or wireless connections. In embodiments in which the aforementioned components are indirectly connected, there may be other networking components or systems (e.g., switches, routers, gateways, etc.) that facilitate communication and/or information exchange. Further, the aforementioned components may communicate with one another using any combination of wired and/or wireless communication protocols.

In one embodiment of the invention, the PCS (102) may be any computing system (see e.g., FIG. 5) used for various applications. These applications may, for example, require large-scale and complex data processing. In one embodiment of the invention, the PCS (102) may be any computing system that may serve multiple users concurrently. Further, the PCS (102) may be programmed to provide and manage the allocation of computing resources (e.g., computer processors, memory, persistent and non-persistent storage, etc.) towards the execution of various processes (i.e., tasks) that may be instantiated by one or more users. Examples of the PCS (102) include, but are not limited to, one or more: desktop computers, laptop computers, smartphones, tablet computers, gaming consoles, servers, mainframes, or any combination thereof.

In one embodiment of the invention, the PCS (102) includes a PCS application program interface (API) (104), a lossless backup agent (LBA) (106), a virtual machine (VM) manager (108), and one or more VMs (110A-110N). Each of these components is described below.

In one embodiment of the invention, the PCS API (104) may be a hardware and/or software implemented construct that employs a set of subroutine definitions, protocols, and/or tools for implementing a specification for the exchange of information between the PCS (102) and any other computing system (e.g., the RCS (114)). For example, the PCS API (104) may establish that the exchange of information may entail a request for processing and a return of a response, if any, based on the outcome of the processing. By way of an example, the PCS API (104) may be a web API accessed through a web page and/or a web browser, and a WAN (e.g., Internet) connection.

In one embodiment of the invention, the PCS API (104) may include any logic necessary to facilitate: (i) receiving one or more virtual machine images (VMIs) (120A-120N) from the LBA (106); and (ii) transmit the one or more VMIs (120A-120N) to the RCS (114) during data backup, data archiving, and/or data disaster recovery operations. One of ordinary skill will appreciate that the PCS API (104) may perform other functionalities without departing from the scope of the invention.

In one embodiment of the invention, the LBA (106) may be a computer program, or a computer process (i.e., an instance of a computer program), executing on the underlying hardware of the PCS (102). Further, the LBA (106) may include functionality to implement embodiments of the invention (see e.g., FIGS. 3A and 3B). Specifically, the LBA (106) may include functionality to: (i) issue requests to the VM manager (108), where the requests may pertain to: (a) identifying one or more VMs (110A-110N) executing on the PCS (102); (b) identifying one or more virtual disks (VDs) (112A-112N) implementing each VM (110A-110N); and (c) obtaining an user-checkpoint tree (UCT) (described below) for each VD (112A-112N); (ii) receive responses from the VM manager (108), where the responses may include an UCT associated with each VD (112A-112N) for one or more VMs (110A-110N), where each UCT includes a set of user-checkpoint branches (UCBs) (described below); (iii) segregate the set of UCBs for each UCT into an active UCB and a set of one or more inactive UCBs; (iv) for each inactive UCB, generate a corresponding inactive branch image (IBI) (described below) first; (v) for the active UCB, generate a corresponding active branch image (ABI) last; (vi) generate a VD image (VDI) for each VD (112A-112N) using the ABI and a set of one or more IBIs; and (vii) generate a VM image (VMI) for each VM (110A-110N) using a set of one or more VDIs.

In one embodiment of the invention, the VM manager (108) may be a computer program, or a computer process (i.e., an instance of a computer program), executing on the underlying hardware of the PCS (102). The VM manager (108) may be tasked with the management of one or more VMs (110A-110N) executing on the PCS (102). Subsequently, with respect to managing the VMs (110A-110N), the VM manager (108) may include functionality to: (i) create or delete one or more VMs (110A-110N); (ii) allocate or deallocate host computing resources that support the execution of one or more VMs (110A-110N); and (iii) maintain intra-host communication between the one or more VMs (110A-110N) and the host (i.e., PCS (102)) hardware components. In one embodiment of the invention, the VM manager (108) may include further functionality to: (i) receive requests from the LBA (106) regarding information associated with, for example, the one or more VMs (110A-110N) that are being managed, the one or more VDs (112A-112N) that which a VM (110A-110N) may be implementing to emulate the behavior of a physical machine or computing system, and/or an UCT pertaining to a respective VD (112A-112N); and (ii) issue responses, back to the LBA (106), including information sought in the requests. One of ordinary skill will appreciate that the VM manager (108) may perform other functionalities without departing from the scope of the invention.

In one embodiment of the invention, a VM (110A-110N) may be a distinct operating environment configured to inherit underlying functionality of the host (e.g., PCS (102)) operating system (OS) (and access to the underlying host hardware) using an abstraction layer. Further, a VM (110A-110N) may include a separate instance of an OS, which may be distinct from the host OS. By way of an example, one or more embodiments of the invention may be implemented based on VMware® architecture, which may involve: (i) one or more VMs (110A-110N) executing on a host computer system such that each VM (110A-110N) serves as a host to an instance of a guest OS; and (ii) a hypervisor layer (e.g., the VM manager (108) at least in part) that serves to facilitate intra-host communications between the one or more VMs (110A-110N) and the host computer system hardware. VMware® is a registered trademark of VMware, Inc.

In one embodiment of the invention, each VM (110A-110N) may implement one or more virtual disks (VDs) (112A-112N) in order to emulate a physical machine or computing system. A VD (112A-112N) may be a software construct that emulates a physical disk device (e.g., an optical disc drive, a floppy disk drive, a hard disk drive, a tape drive, etc.). Further, a VD (112A-112N) may include functionality to store OSs, applications, and data used to execute the VM (110A-110N) with which it is associated. This information may be organized within the VD (112A-112N) in the form of, for example, a filesystem including a hierarchy of one or more files and folders.

In one embodiment of the invention, the RCS (114) may be a data backup, archiving, and/or disaster recovery (DR) storage system. The RCS (114) may be implemented on one or more servers (not shown). Each server may be a physical server (i.e., within a datacenter) or a virtual server (that may be cloud-based). In one embodiment of the invention, the RCS (114) may be implemented on one or more computing systems similar to the exemplary computing system shown in FIG. 5. The RCS (114) includes a RCS API (116) and a data repository (118). Each of these components is described below.

In one embodiment of the invention, the RCS API (116) may be a hardware and/or software implemented construct that employs a set of subroutine definitions, protocols, and/or tools for implementing a specification for the exchange of information between the RCS (114) and any other computing system (e.g., the PCS (102)). For example, the RCS API (116) may establish that the exchange of information may entail a request for processing and a return of a response, if any, based on the outcome of the processing. By way of an example, the RCS API (116) may be a web API accessed through a web page and/or a web browser, and a WAN (e.g., Internet) connection.

In one embodiment of the invention, the RCS API (116) may include any logic necessary to facilitate: (i) receiving one or more VMIs (120A-120N) from the PCS (102); and (ii) accessing the data repository (118) to store the one or more VMIs (120A-120N). One of ordinary skill will appreciate that the RCS API (116) may perform other functionalities without departing from the scope of the invention.

In one embodiment of the invention, the data repository (118) may be a storage system or medium for consolidating various forms of data. The data repository (118) may be implemented using any type of storage unit and/or device (e.g., a filesystem, a database, a collection of tables, or any other storage mechanism). In one embodiment of the invention, the data repository (118) may be implemented using multiple storage units and/or devices, which may or may not be of the same type or located at the same physical site. Further, the data repository (118) may be implemented using persistent (i.e., non-volatile) storage media such as, for example, optical storage, magnetic storage, NAND Flash Memory, NOR Flash Memory, Magnetic Random Access Memory (M-RAM), Spin Torque Magnetic RAM (ST-RAM), Phase Change Memory (PCM), or any other memory defined as a non-volatile Storage Class Memory (SCM).

In one embodiment of the invention, the data repository (118) may be configured to store one or more VMIs (120A-120N). A VMI (120A-120N) may be an image-based snapshot of a VM (110A-110N) at a given time. In other words, a VMI (120A-120N) may be an exact copy of the entire contents of a VM (110A-110N) for a given time. Subsequently, a VMI (120A-120N) may preserve, but is not limited to preserving: (i) the running state (e.g., powered-on, powered-off, suspended, etc.) of a corresponding VM (110A-110N) at the given time the VMI (120A-120N) had been instantiated; (ii) the underlying host (i.e., PCS (102)) configuration (e.g., number of computer processors, amount of memory and persistent storage, number of network interfaces, etc.) allocated for execution of a corresponding VM (110A-110N) at the given time the VMI (120A-120N) had been instantiated; and (iii) virtual disk (VD) data (i.e., one or more VD images (VDIs) (122)) (described below), at least in part, implementing a corresponding VM (110A-110N) at the given time the VMI (120A-120N) had been instantiated.

In one embodiment of the invention, a VDI (122) may be an image-based snapshot of at least a portion of a VD (112A-112N) at a given time. That is, a VD (112A-112N) may be represented through one or more VDIs (122), where each VDI (122) may be an exact copy of the at least a subset of the contents of a VD (112A-112N) for a given time. Subsequently, a VDI (122) may preserve, but is not limited to preserving: (i) the running state and configuration for one or more OSs executing on a corresponding VD (112A-112N) at the given time the VDI (122) had been instantiated; (ii) the running state and configuration for one or more applications (i.e., computer programs) executing on a corresponding VD (112A-112N) at the given time the VDI (122) had been instantiated; (iii) the raw data (e.g., binary information contained in each disk sector) stored within a corresponding VD (112A-112N) at the given time the VDI (122) had been instantiated; and (iv) the raw data metadata (e.g., information describing the raw data) stored within a corresponding VD (112A-112N) at the given time the VDI (122) had been instantiated.

While FIG. 1 shows a configuration of components, other system configurations may be used without departing from the scope of the invention.

Figure 2:
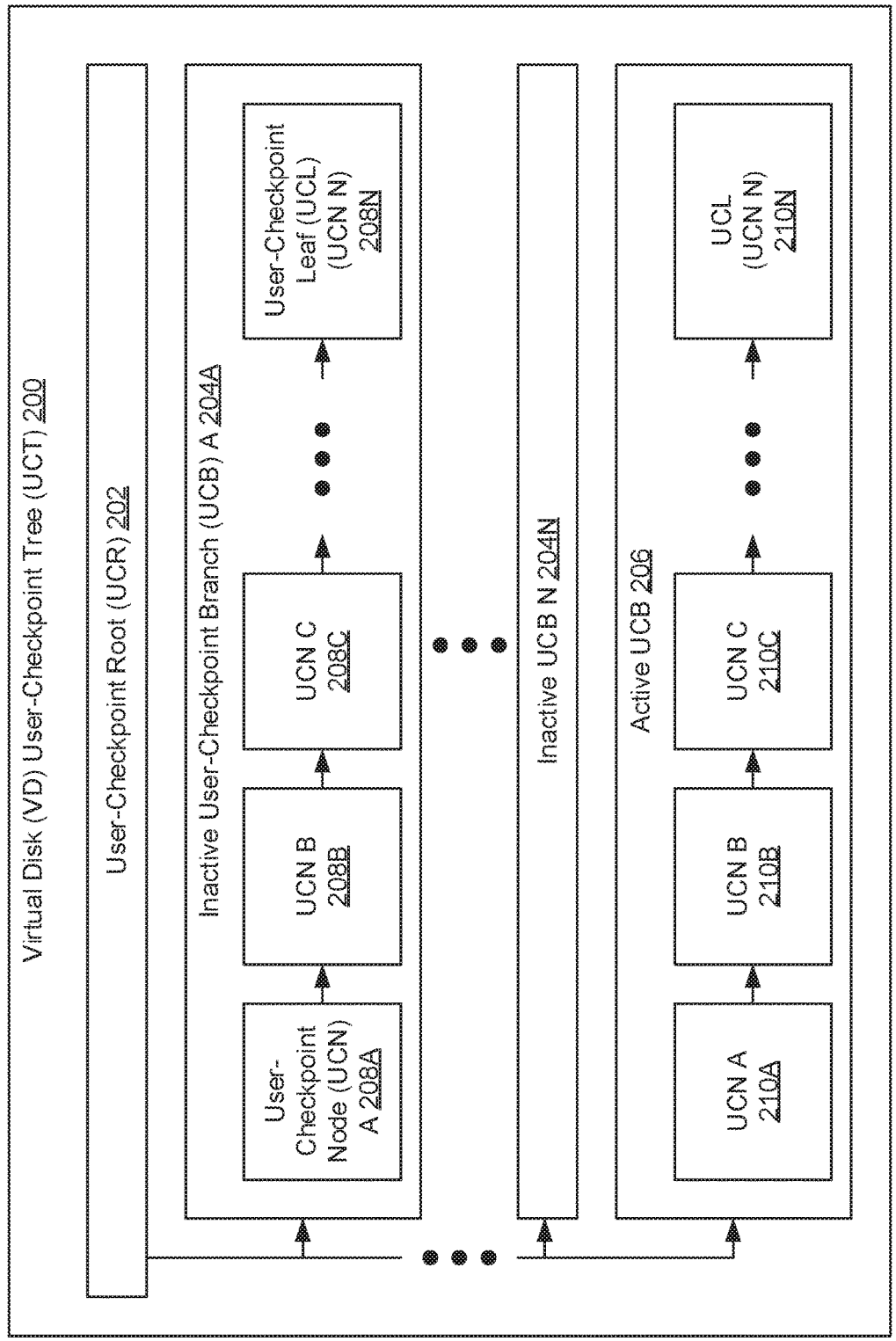
FIG. 2 shows a virtual disk user-checkpoint tree in accordance with one or more embodiments of the invention.

FIG. 2 shows a virtual disk (VD) user-checkpoint tree (UCT) in accordance with one or more embodiments of the invention. The UCT (200) may be a data structure, or a hierarchy of user-checkpoints (described below), that may track incremental changes performed to, or versions of, a VD. The UCT (200) includes a user-checkpoint root (UCR) (202) and one or more user-checkpoint branches (UCBs) (204A-204N, 206) that stem therefrom. Each of these components is described below.

In one embodiment of the invention, the UCR (202) may be an original or initial state of the VD to which the UCT (200) pertains. In one embodiment of the invention, the UCR (202) may also be disclosed herein as the root parent disk or the non-differencing disk. With respect to the hierarchy of the UCT (200), the UCR (202)—as the topmost node in the hierarchy—may not be a child disk (or child node) for any other disk (or node), however, may itself be a parent disk (or parent node) for one or more first disks (e.g., user-checkpoint nodes (UCN) A (208A, 210A)) of each UCB (204A-204N, 206). Said another way, each first disk (i.e., the oldest or leftmost UCN) of each UCB (204A-204N, 206) may be a direct child disk (or direct child node) of the UCR (202).

In one embodiment of the invention, the UCT (200) may include one or more UCBs (204A-204N, 206) that stem from the UCR (202). Each UCB (204A-204N, 206) may represent an independent set of changes that have cascaded from the original state of the VD (i.e., the UCR (202)). In one embodiment of the invention, each UCB (204A-204N, 206) may also be disclosed herein as a differencing disk chain. Further, in one embodiment of the invention, of the set of UCBs (204A-204N, 206) in the UCT (200), one may be designated the active UCB (206), while the UCBs in the remaining subset may each designated an inactive UCB (204A-204N).

In one embodiment of the invention, the active UCB (206) may refer to the succession of user-checkpoints (i.e., UCNs (210A-210N)) that includes the current, active or running state (i.e., UCL/UCN N (210N)) of the VD to which the UCT (200) pertains. Conversely, an inactive UCB (204A-204N) may refer to a succession of user-checkpoints that excludes the current, active or running state of the VD although changes to VD state may still continue to be performed therefrom. Furthermore, in one embodiment of the invention, a user-checkpoint (or UCN (208A-208N, 210A-210N)) may represent a snapshot of an incremental state of the VD, which may have been instantiated by a user of the PCS.

In one embodiment of the invention, each UCB (204A-204N, 206) may be represented through a set of cascading UCNs (208A-208N). In one embodiment of the invention, any UCN (208A-208N, 210A-210N) may also be disclosed herein as a differencing disk. Moreover, along a respective UCB (204A-204N, 206), each successive UCN (208A-208N, 210A-210N) may represent a snapshot of the incremental changes or differences made to or since a previous VD state in the respective UCB (204A-204N, 206), which may be represented through a previous UCN (208A-208N, 210A-210N) (i.e., a parent disk or node).

For example, in referring to the active UCB (206): (i) UCN A (210A) may represent a snapshot of incremental changes/differences made to or since the original/initial VD state or UCR (202); (ii) UCN B (210B) may represent a snapshot of incremental changes/differences made to or since UCN A (210A); (iii) UCN C (210C) may represent a snapshot of incremental changes/differences made to or since UCN B (210B); and so on. Subsequently, in terms of hierarchy, each successive UCN (208A-208N, 210A-210N) may be a child disk (or child node) of a previous UCN (208A-208N, 210A-210N), which may be designated as a parent disk (or parent node) of that successive UCN (208A-208N, 210A-210N), in the respective UCB (204A-204N, 206). For example, referring back to the active UCB (206): (i) UCN A (210A) may be the child disk/node of the UCR (202), however, may be the parent disk/node for UCN B (210B); (ii) UCN B (210B) may be the child disk/node of UCN A (210A), however, may be the parent disk/node for UCN C (210C); and so on.

In one embodiment of the invention, isolating the above-mentioned incremental changes/differences (i.e., block data) made to or since each previous version of the VD may entail: (i) identifying the modified sectors in the VD since the previous snapshot and, subsequently, (ii) creating another snapshot representative of the identified modified sectors. The created snapshot may include, but is not limited to including: (i) the modified raw data identified in the VD; and (ii) metadata describing the modified raw data such as, for example: (a) the one or more sector offsets (i.e., the number of bytes that are offset from the beginning of a sector) that designate which one or more sectors, of the VD, contain the modified raw data; and (b) a logical data sector index specifying the location (or logical address) of blocks of data stored in the VD, where a logical address may be an N-bit value that maps to a corresponding physical address of blocks of data stored in a physical storage device (e.g., an optical disc drive, a floppy disk drive, a hard disk drive, a tape drive, etc.) residing on the PCS.

In one embodiment of the invention, the last or latest UCN (e.g., 208N, 210N) in each UCB (204A-204N, 206) may be designated a user-checkpoint leaf (UCL). Subsequently, each UCL (208N, 210N) may represent a snapshot of the latest or most recent changes/differences to VD state made within a respective UCB (204A-204N, 206). Further, as mentioned above, the UCL (210N) of the active UCB (206) may represent the current, active or running state of the VD to which the UCT (200) pertains.

Figure 3A:
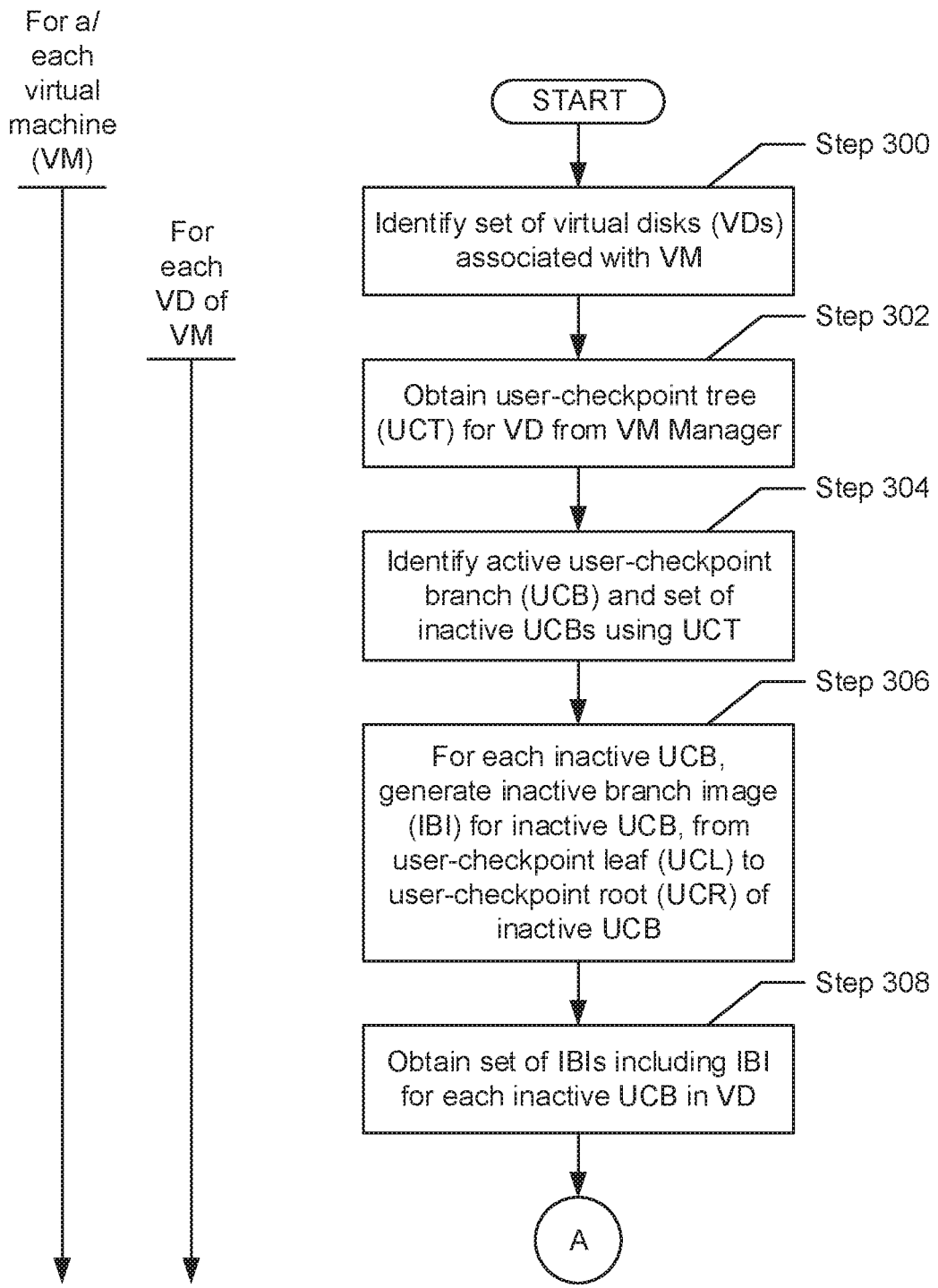
FIGS. 3A and 3B show flowcharts describing a method for implementing data lossless synthetic full backups in accordance with one or more embodiments of the invention.
Figure 3B:
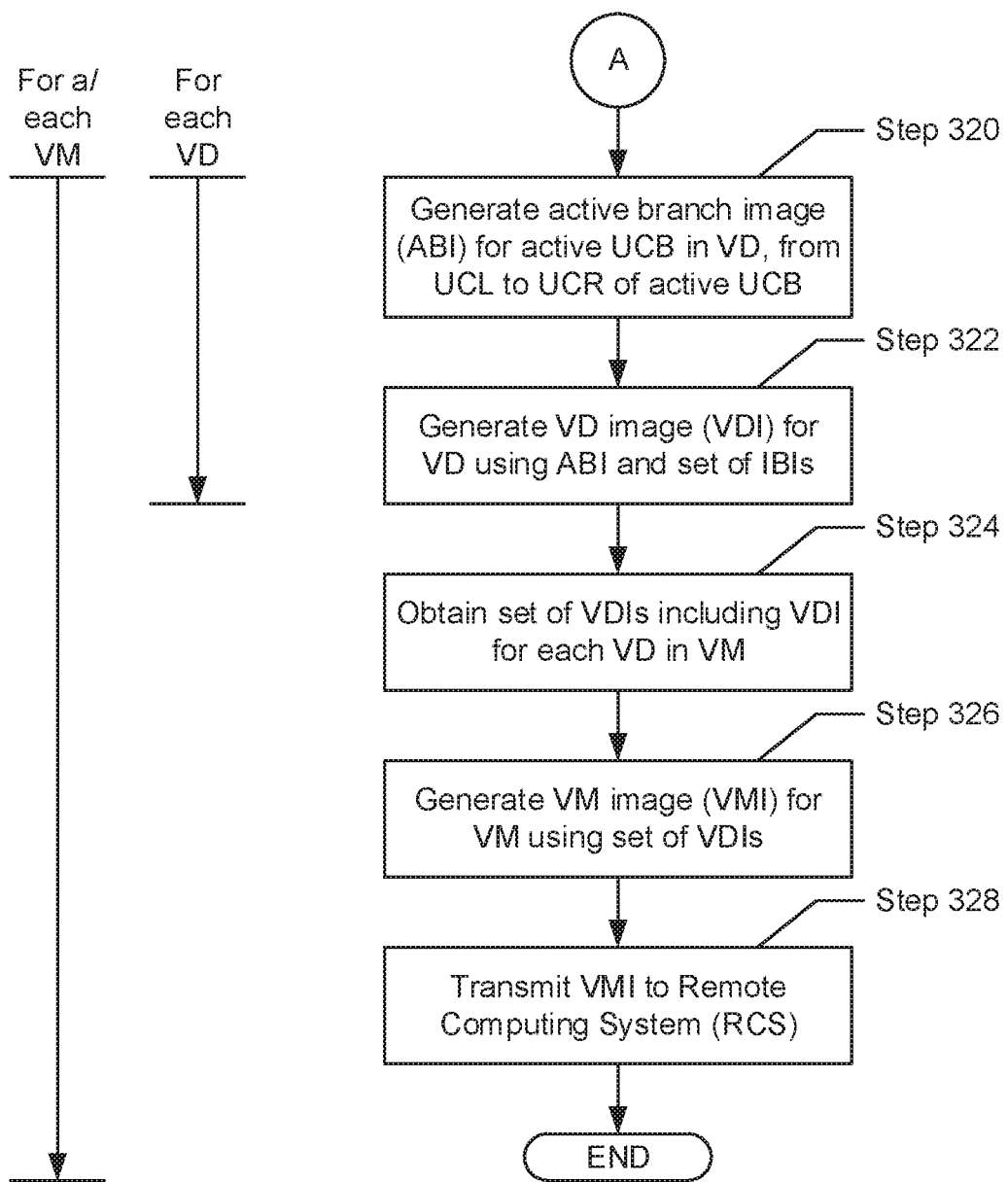

FIGS. 3A and 3B show flowcharts describing a method for implementing data lossless synthetic full backups in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

In one embodiment of the invention, each iteration of the various steps (i.e., Steps 300 through 328) shown in FIGS. 3A and 3B may be performed for a or each virtual machine (VM) executing on a production computing system (PCS) (see e.g., FIG. 1). Furthermore, in one embodiment of the invention, a subset of the various steps (i.e., Steps 302 through 322) may be performed for a or each virtual disk (VD) of the respective VM.

Turning to FIG. 3A, in Step 300, a set of one or more VDs is identified. In one embodiment of the invention, the set of VDs may pertain to, or may be associated with, a VM executing on a PCS. Further, identification of the one or more VDs may be performed by a VM manager, which may be responsible for at least the aforementioned VM, and in response to the submission of a request from the lossless backup agent (LBA) (see e.g., FIG. 1). The request may pertain to the acquisition of information (e.g., UCTs (see e.g., FIG. 2)) pertinent to the execution of data backup, data archiving, and/or data disaster recovery operations for data stored in the VDs. In one embodiment of the invention, the VM manager may examine a filesystem hierarchy of the VM to identify the set of VDs. In another embodiment of the invention, the VM manager may examine a data table or any other data structure that may map one or more VMs to their corresponding VDs (and/or other sub-components).

In Step 302, for each VD specified in the set of VDs (identified in Step 300), an user-checkpoint tree (UCT) for the VD is obtained. In one embodiment of the invention, the UCT may represent a hierarchy of user-checkpoints, maintained by the VM manager, which may track incremental changes performed to, or versions of, the VD. Further, a user-checkpoint may represent a snapshot of an incremental state of the VD, which may have been performed by a user of the PCS.

In Step 304, using or based on the UCT (obtained in Step 302), an active user-checkpoint branch (UCB) and a set of one or more inactive UCBs are identified. In one embodiment of the invention, any existing disk chain algorithm may be applied to the UCT, which may thereby identify, but is not limited to identifying, the active UCB and the set of inactive UCBs. In one embodiment of the invention, the disk chain algorithm may further identify the user-checkpoint root (UCR) of the UCT, which may be representative of the original or initial state of the VD, and the user-checkpoint leaf (UCL) for each UCB—active or inactive—in the UCT, which may correspond to the latest user-checkpoint in each respective UCB.

In Step 306, for each inactive UCB in the set of inactive UCBs (identified in Step 304), an inactive branch image (IBI) is generated based on the respective inactive UCB. In one embodiment of the invention, the IBI may be an image-based snapshot of, or an exact copy of contents in, the respective inactive UCB. Further, generation of the IBI may entail replicating each user-checkpoint node (UCN) starting from the UCL of the respective inactive UCB to the UCR of the UCT. By way of an example, if an inactive UCB included five UCNs—e.g., UCN A, UCN B, UCN C, UCN D, and UCN E—wherein UCN A is the oldest snapshot (i.e., a direct child node of the UCR) and UCN E is the latest snapshot in the inactive UCB, then generation of the IBI would entail: (i) replicating UCN E first; (ii) replicating UCN D second; (iii) replicating UCN C third; (iv) replicating UCN B fourth; (v) replicating UCN A fifth; and finally, (vi) replicating the UCR last. In Step 308, in generating an IBI for each inactive UCB in the UCT for the VD, a set of IBIs is obtained.

Turning to FIG. 3B, in Step 320, following the generation of an IBI for each inactive UCB (in Step 306), an active branch image (ABI) is generated based on the active UCB (also identified in Step 304). In one embodiment of the invention, the ABI may be an image-based snapshot of, or an exact copy of contents in, the active UCB. Similar to that which is described above, generation of the ABI may entail replicating each UCN starting from the UCL of the active UCB, which may be representative of the current state (or differencing disk) of the VD, to the UCR of the UCT.

In Step 322, a VD image (VDI) is generated for the VD. In one embodiment of the invention, the VDI may be an image-based snapshot of, or an exact copy of contents in, the respective VD. Further, generation of the VDI may entail using or including the set of IBIs (obtained in Step 308) and the ABI (generated in Step 320) for the respective VD. In Step 324, following the generation of a VDI for each VD (identified in Step 300) of the VM, a set of VDIs is obtained.

In Step 326, a VM image (VMI) is generated for the VM. In one embodiment of the invention, the VMI may be an image-based snapshot of, or an exact copy of contents in, the VM. Further, generation of the VMI may entail using or including the set of VDIs (obtained in Step 324) for the VM. In Step 328, the VMI (generated in Step 326) is transmitted towards a remote computing system (RCS) (see e.g., FIG. 1). Specifically, in one embodiment of the invention, following the generation of the VMI, the LBA may relay the VMI to the PCS application program interface (API), which in turn, may encode and transmit the VMI to the RCS. The RCS may be a data backup, archiving, and/or disaster recovery (DR) storage system for at least the PCS.

Figure 4:
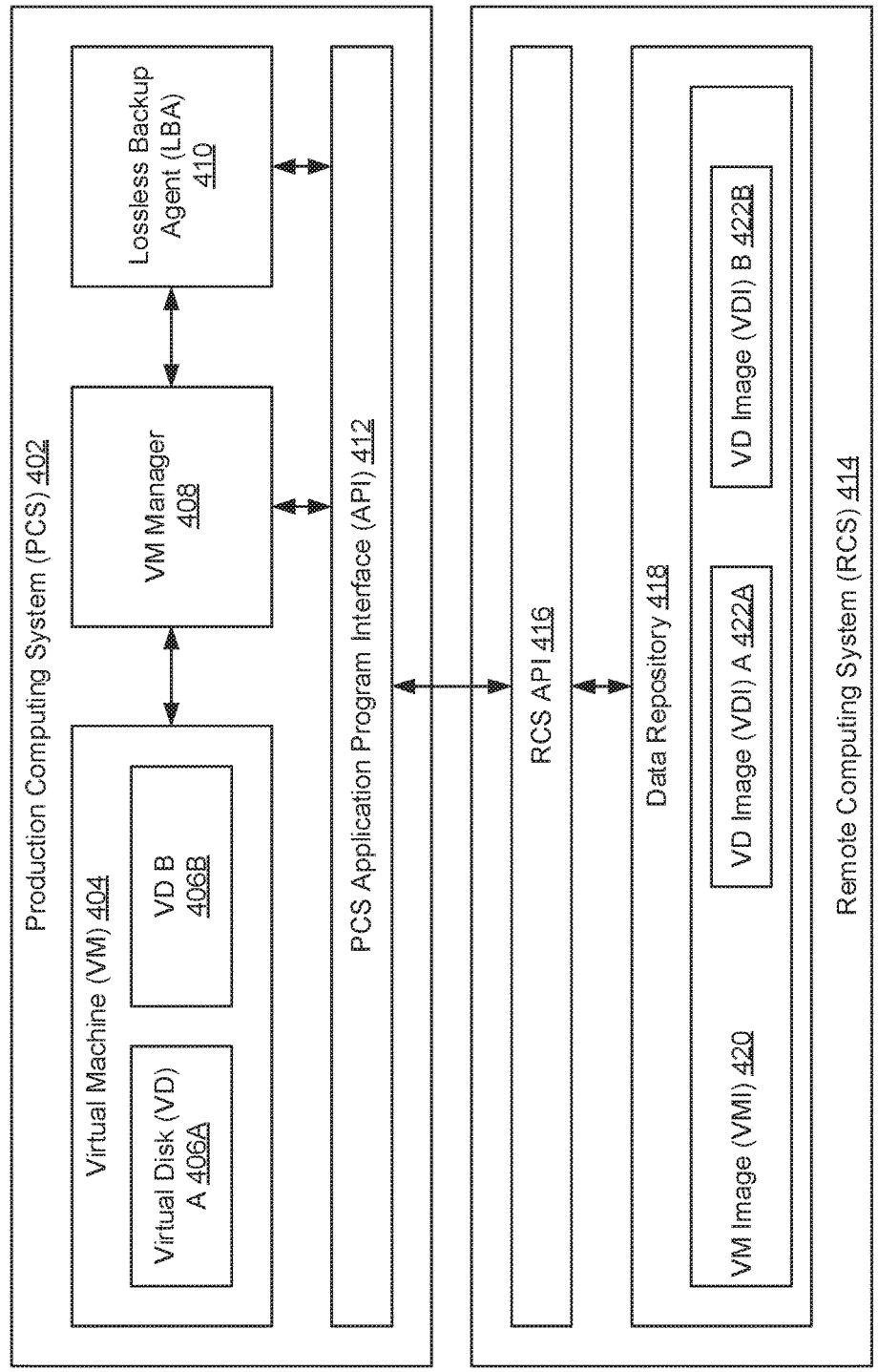
FIG. 4 shows an example system in accordance with one or more embodiments of the invention.

FIG. 4 shows an example system in accordance with one or more embodiments of the invention. The following example, presented in conjunction with components shown in FIG. 4, is for explanatory purposes only and not intended to limit the scope of the invention.

Turning to FIG. 4, the example system (400) includes a PCS (402) operatively connected to a RCS (414), where more specifically, the PCS API (412) executing on the PCS (402) is operatively connected to the RCS API (416) executing on the RCS (414). The PCS (402) further includes a VM (404), which is implementing two VDs (406A, 406B). Within the PCS (402), there also resides a VM manager (408) responsible for the VM (404), and a LBA (410), which substantively performs embodiments of the invention (see e.g., FIGS. 3A and 3B). With regards to the RCS (414), the RCS (414) further includes a data repository (418), wherein, through the discussion of the example scenario to follow, the VMI (420) for the VM (404) may be stored. The VMI (420) may include the generated VDIs (422A, 422B) (described below) for the VDs (406A, 406B), respectively.

Turning to the example, consider a scenario whereby an order to backup VMs (404) executing on the PCS (402) is issued. The order may be issued by an administrator or user of the PCS (402). Subsequently, in response to the order, the LBA (410) issues a request to the VM manager (408) pertaining to: (i) the identification of VMs (404) executing on the PCS (402); (ii) the identification of VDs (406A, 406B) constituting each VM (404); and (iii) an UCT (not shown) for each VD (406A, 406B) identified in (ii). Based on the request, the VM manager (408) may thereafter examine the filesystem hierarchy for each VM (404) being supervised by the VM manager (408) to identify the VDs (406A, 406B) for the respective VM (404), and the UCTs for each VD (406A, 406B), respectively. After obtaining, for the purposes of this example, the two UCTs for VD A (406A) and VD B (406B) of the VM (404), the VM manager (408) issues a response, including at least the two UCTs, to the LBA (410).

In receiving the two UCTs (not shown) from the VM manager (408), the LBA (410) proceeds to perform a set of separate backup operations for each UCT as follows: (i) foremost, the LBA (410) employs a disk chain algorithm to identify at least the active UCB (not shown) and one or more inactive UCBs (not shown) in the UCT, along with the UCR (i.e., the original/initial state of the respective VD); (ii) for each identified inactive UCB, the LBA (410) performs a separate backup operation by generating an IBI based on the respective inactive UCB, where generation of the IBI proceeds by replicating the UCL (i.e., latest VD snapshot) of the respective inactive UCB first, followed by replicating each previous UCN along the respective inactive UCB until the UCR; (iii) for the identified active UCB, the LBA (410) performs a final separate backup operation by generating an ABI based on the active UCB, where generation of the ABI proceeds by also replicating the UCL of the active UCB first, followed by replicating each previous UCN along the active UCB until the UCR; and (iv) lastly, the LBA (410) generates a VDI (422A, 422B) for the respective VD (406A, 406B) based on, using, or including the set of IBIs corresponding to the set of inactive UCBs and the ABI corresponding to the active UCB within the UCT (not shown) for the respective VD (406A, 406B).

After obtaining the pair of VDIs (422A, 422B), the LBA (410) subsequently generates a VMI (420) for the VM (404). The VMI (420), as portrayed in FIG. 4, may be generated based on, using, or including the pair of VDIs (422A, 422B) generated/obtained earlier. Thereafter, the LBA (410) submits or relays the VMI (420) to the PCS API (412). Upon receiving the VMI (420), the PCS API (412) transmits the VMI (420) towards the RCS (414). In receiving the VMI (420) from the PCS (402), the RCS API (416) proceeds to store the VMI (420) (including the pair of VDIs (422A, 422B)) in the data repository (418) residing on the RCS (414).

Figure 5:
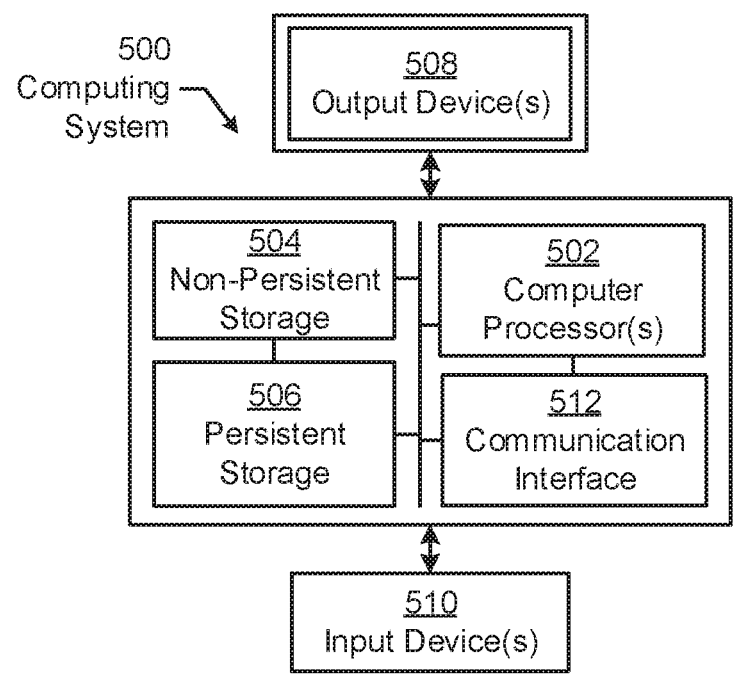
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention disclosed herein relate to a method and system for implementing data lossless synthetic full backups. In traditional synthetic full backups, the inactive UCBs (described above) within a UCT for a VD are not considered during the backup operation. As a result, only the active UCB within the UCT is replicated and subsequently stored at a remote site (e.g., a RCS). This limitation to the conventional backup operation thus leads to data loss for users involved in the development of the one or more inactive UCBs of the UCT for the respective VD. Accordingly, embodiments of the invention may be advantageous over existing implementations of synthetic full backups at least because one or more embodiments of the invention consider all UCBs—active and inactive—within a UCT, and subsequently, performs a separate backup operation for each UCB. In considering all UCBs, no data is lost for the respective VD.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for archiving data, comprising:
   selecting a virtual machine (VM) executing on a first computing system;

identifying at least one virtual disk (VD) associated with the VM;
for each VD of the at least one VD:
  obtaining a user-checkpoint tree (UCT) for the VD;
  identifying, within the UCT, a set of user-checkpoint branches (UCBs) comprising an active UCB and at least one inactive UCB;
  generating a VD image (VDI) based on the at least one inactive UCB and the active UCB; and
  after generating the VDI for each VD of the at least one VD, to obtain at least one VDI:
    generating, for the VM, a VM image (VMI) comprising the at least one VDI.

2. The method of claim 1, wherein the UCT comprises a hierarchy of user-checkpoints, wherein the hierarchy of user-checkpoints comprises a user-checkpoint root (UCR) and the set of UCBs, wherein each UCB in the set of UCBs stem from the UCR.

3. The method of claim 1, wherein each UCB of the set of UCBs comprises a plurality of successive user-checkpoint nodes (UCNs).

4. The method of claim 1, wherein the active UCB comprises a current user-checkpoint node (UCN) representing a current state of the VD.

5. The method of claim 1, wherein generating the VDI based on the at least one inactive UCB and the active UCB, comprises:
  generating, for each inactive UCB of the at least one inactive UCB, an inactive branch image (IBI) based on the inactive UCB;
  after generating the IBI for each inactive UCB of the at least one inactive UCB, to obtain at least one IBI:
    generating an active branch image (ABI) based on the active UCB; and
    generating the VDI, wherein the VDI comprises the at least one inactive IBI and the ABI.

6. The method of claim 5, wherein generating the IBI based on the inactive UCB, comprises:
  identifying a latest user-checkpoint node (UCN), in a chain of UCNs representing the inactive UCB, as a user-checkpoint leaf (UCL);
  identifying a user-checkpoint root (UCR) of the UCT; and
  for each UCN in the chain of UCNs, along a reverse chronological order, from the UCL to the UCR:
    replicating the UCN to generate a portion of the IBI.

7. The method of claim 6, wherein the UCR is a snapshot of an initial state of the VD, wherein each successive UCN in the chain of UCNs is a snapshot of an incremental change to the VD.

8. The method of claim 1, further comprising:
  transmitting the VMI to a second computing system for storage.

9. A system, comprising:
at least one virtual machine (VM);
a VM manager operatively connected to and responsible for the at least one VM; and
a lossless backup agent (LBA) operatively connected to the VM manager, and programmed to:
  select the at least one VM;
  issue a request to the VM manager pertaining to identifying at least one virtual disk (VD) associated with the at least one VM;
  for each VD of the at least one VD:
    obtain, from the VM manager, a user-checkpoint tree (UCT) for the VD;
    identify, within the UCT, a set of user-checkpoint branches (UCBs) comprising an active UCB and at least one inactive UCB;
    generate a VD image (VDI) based on the at least one inactive UCB and the active UCB; and
    after generating the VDI for each VD of the at least one VD, to obtain at least one VDI:
      generate, for the at least one VM, a VM image (VMI) comprising the at least one VDI.

10. The system of claim 9, further comprising:
a first computing system comprising a first application program interface (API), the LBA, the VM manager, and the at least one VM executing thereon.

11. The system of claim 10, further comprising:
a second API operatively connected to the first API; and
a data repository operatively connected to the second API,
wherein the first API is programmed to:
  obtain the VMI from the LBA; and
  transmit the VMI to the second API,
wherein the second API is programmed to:
  receive the VMI from the first API; and
  store the VMI in the data repository.

12. The system of claim 11, further comprising:
a second computing system comprising the second API and the data repository.

13. A non-transitory computer readable medium (CRM) comprising computer readable program code, which when executed by a computer processor, enables the computer processor to:
select a virtual machine (VM) executing on a first computing system;
identify at least one virtual disk (VD) associated with the VM;
for each VD of the at least one VD:
  obtain a user-checkpoint tree (UCT) for the VD;
  identify, within the UCT, a set of user-checkpoint branches (UCBs) comprising an active UCB and at least one inactive UCB;
  generate a VD image (VDI) based on the at least one inactive UCB and the active UCB; and
  after generating the VDI for each VD of the at least one VD, to obtain at least one VDI:
    generate, for the VM, a VM image (VMI) comprising the at least one VDI.

14. The non-transitory CRM of claim 13, wherein the UCT comprises a hierarchy of user-checkpoints, wherein the hierarchy of user-checkpoints comprises a user-checkpoint root (UCR) and the set of UCBs, wherein each UCB in the set of UCBs stem from the UCR.

15. The non-transitory CRM of claim 13, wherein each UCB of the set of UCBs comprises a plurality of successive user-checkpoint nodes (UCNs).

16. The non-transitory CRM of claim 13, wherein the active UCB comprises a current user-checkpoint node (UCN) representing a current state of the VD.

17. The non-transitory CRM of claim 13, wherein to generate the VDI based on the at least one inactive UCB and the active UCB, the computer readable program code, which when executed by the computer processor, enables the computer processor to:
generate, for each inactive UCB of the at least one inactive UCB, an inactive branch image (IBI) based on the inactive UCB;
after generating the IBI for each inactive UCB of the at least one inactive UCB, to obtain at least one IBI:
  generate an active branch image (ABI) based on the active UCB; and generate the VDI, wherein the VDI comprises the at least one inactive IBI and the ABI.

18. The non-transitory CRM of claim 17, wherein to generate the IBI based on the inactive UCB, the computer readable program code, which when executed by the computer processor, enables the computer processor to:
  identify a latest user-checkpoint node (UCN), in a chain of UCNs representing the inactive UCB, as a user-checkpoint leaf (UCL);
  identify a user-checkpoint root (UCR) of the UCT; and
  for each UCN in the chain of UCNs, along a reverse chronological order, from the UCL to the UCR:
    replicate the UCN to generate a portion of the IBI.

19. The non-transitory CRM of claim 18, wherein the UCR is a snapshot of an initial state of the VD, wherein each successive UCN in the chain of UCNs is a snapshot of an incremental change to the VD.

20. The non-transitory CRM of claim 13, further comprising computer readable program code, which when executed by the computer processor, enables the computer processor to:
  transmit the VMI to a second computing system for storage.

* * * * *